United States Patent [19]

McMillian

[11] Patent Number: 5,895,893
[45] Date of Patent: Apr. 20, 1999

[54] MOBILE SCALE

[76] Inventor: John McMillian, 9816 Jacobsen La., Gig Harbor, Wash. 98332

[21] Appl. No.: 08/850,675

[22] Filed: May 2, 1997

[51] Int. Cl.$^6$ .................... G01G 21/00; G01G 23/14; G01G 19/00
[52] U.S. Cl. .................... 177/126; 177/173; 177/202; 177/245; 177/263; 428/16; 116/215; 116/280
[58] Field of Search .................... 177/126, 150, 177/170, 171, 173, 190, 202, 245, 253, 263, 264, 168, 186, 220, 224; 428/8, 16; 116/215, 280, 285, 303

[56] References Cited

U.S. PATENT DOCUMENTS

| | | | |
|---|---|---|---|
| 313,477 | 3/1885 | Davids | 177/220 |
| 314,801 | 3/1885 | Clausen | 177/245 |
| 373,326 | 11/1887 | Witherbell | 177/245 |
| 576,243 | 2/1897 | Vreede | 116/280 |
| 658,603 | 9/1900 | Waegel | 177/245 |
| 668,349 | 2/1901 | Eschemann | 177/224 |
| 1,305,638 | 6/1919 | Bamforth | 116/280 |
| 1,321,595 | 11/1919 | Cady | 177/220 |
| 1,367,972 | 2/1921 | Hyde | 177/220 |
| 1,383,061 | 6/1921 | Bamforth | 116/280 |
| 1,729,890 | 10/1929 | Meyer | 116/280 |
| 2,413,166 | 12/1946 | Bowman | 177/224 |
| 2,476,399 | 7/1949 | Benjamin | 177/264 |
| 2,646,979 | 7/1953 | Weber | 177/263 |
| 2,864,613 | 12/1958 | Porter | 116/215 |
| 3,454,120 | 7/1969 | Peterson | 177/263 |
| 3,599,738 | 8/1971 | Wickenberg | 177/126 |
| 4,425,388 | 1/1984 | Oppenheimer, Jr. | 428/16 |
| 4,799,560 | 1/1989 | Kobayashi | 177/224 |

*Primary Examiner*—Randy W. Gibson
*Attorney, Agent, or Firm*—Seed and Berry LLP

[57] ABSTRACT

A combination flight simulating mobile device and scale formed in appearance of a variety of different birds, or like flying creatures, that may be fabricated from steel sheet or like material, readily assembled, and balanced in such manner that when suspended, the weight of the wings (12 and 14) of the bird is used to counterbalance both the body (10) of the bird and the weight of a lightweight object (74), such as an envelope, and provide a measurement of the object's weight and a realistic replication of a creature in flight.

18 Claims, 2 Drawing Sheets

MOBILE SCALE

TECHNICAL FIELD

This invention relates to mobiles and, more particularly, to a combination mobile and functional scale for weighing and visually displaying the weight of lightobjects such as postal letters.

BACKGROUND OF THE INVENTION

Heretofore, mobile devices have been provided for use as decorative devices, such as a mobile device comprising a simulation of a bird in flight taught by U.S. Pat. No. 4,425,388 issued to Oppenheimer on Jan. 10, 1984. This and similar disclosures offer mobiles with functions limited to ornamentation and decoration.

Heretofore, suspended envelope scales have been provided with a singular function such as determining the weight of an envelope as disclosed by U.S. Pat. No. 3,599,738 issued to Wickenberg on Aug. 17, 1971, or multiple functions, such as an envelope scale and rule combination, as illustrated by U.S. Pat. No. 4,281,461 issued to Roe on Aug. 4, 1981 and U.S. Pat. No. 3,365,011 issued to Heil on Jan. 23, 1968. These and similar disclosures offer suspended envelope scales with functions limited to the measurement of length and weight.

None of the devices noted above is intended to, or could function to provide both a creature that accurately simulates flight and the provision of an envelope scale.

Devices of the type disclosed by Oppenheimer in U.S. Pat. No. 4,425,388 have been comprised of a generally planar body portion to which wing portions have been hingedly connected as by strings looped through apertures in the body and wings. A hanger or spreader bar is provided having spaced suspension portions forming anchor points for thin flexible filaments extending between the suspension portions of the spreader bar and spaced points on the wings.

In order to provide an accurate replication of flights, it is necessary that the points of connection between the filament and the wings be carefully controlled such that in a still air environment, the creature is suspended with the wings in an upward inclination from true horizontal, essentially dihedral angle, whereby when the device is exposed to an air current, the body will oscillate upwardly and downwardly, such that the wings are sequentially inclined downwardly toward the body and upwardly toward the body, providing the desired illusion of flight.

While it is feasible to fabricate a mobile of the type described on a custom basis, wherein the maker by hand is enabled painstakingly to arrive at appropriate balance points, the mass production of a mobile of the type described poses problems. Another complication is encountered when it is desired to provide a variety of different flying creatures, the configuration or silhouettes of which are intended to accurately simulate the configurations of real birds or like creatures. Since the wing and body shapes of such creatures vary markedly one from another, it is evident that their balance points also will vary. Since even the slightest variations in weight and balance of the wing and body components will materially affect the suspended orientation of the mobile, prior devices have offered an attachment arrangement that provides a range of connection positions between filament and wings whereby an adjustment can be made to accommodate the wide variety of wing and body configurations and weights. Although this method of attachment can be produced on a production basis, an adjustable connection and the use of a flexible filament as a connecting means is incapable of sustaining conditions of heavy use and unpredictably high outdoor air currents without breakage or misalignment.

Devices of the type disclosed by Oppenheimer in U.S. Pat. No. 4,425,388 offer the replication of a winged creature in flight by a singular means, that is, the exposure of the device to an air current, thereby limiting the use of the device to locations such as an outdoor environment or in the vicinity of the moving air of a fan. Additionally, such devices require the purchaser to assemble the wings in hinged connection to the body portion and accurately connect the filament to the wings to balance the mobile device such that the wings, in static air conditions, assume the desired position. This may be cause for distress by the purchaser, especially someone who is neither mechanically inclined nor adept with hand work.

SUMMARY OF THE INVENTION

The present invention proposes to avoid the functional limitations and the problems inherent in the prior art, and particularly the prior device described above, by providing a decorative winged creature that displays an accurate simulation of flight and comprises an inherent balancing element for use as a scale for weighing objects such as an envelope. More specifically, the present invention may be summarized as directed to a mobile including a body portion and wing portions whereby the hingedly connected wing and body components are pre-balanced by design to accurately balance the mobile device such that the wings, in static air conditions, assume the desired position, preferably a dihedral position, regardless of the variation of configurations or silhouettes of which are intended accurately to simulate the configuration of real birds or like creatures. An image is either chemically etched into each side of a sheet of metal or stamped out of a sheet of metal. Such processes, regardless of the production quantities, provide identical pre-balanced parts eliminating the need for the purchaser of the item to adjust the balance to the device.

The present invention proposes to solve the problems inherent in prior devices, and particularly the prior device described above by providing a means or mechanism for pre-assembling the wings in a permanent hinged connection to the body portion, such that when folded, the device conforms to economical shipment in a flat package enclosure. This eliminates the need for the purchaser of the item to assemble the wing portions in hinged connection to the body portion.

Pre-balanced by design, a computer generated image provides a fixed attachment formed as fold-up tabs in the wings. Each tab is formed with an aperture for the pivotal attachment of a rigid suspensory filament made from durable material such as stainless steel wire. This provides a mobile device that can be assembled and inspected for quality of function and appearance prior to shipment to the user and a mobile device capable of sustaining conditions of heavy use and high outdoor air currents without breakage. The need for the user to accurately balance the device is eliminated.

The present invention contemplates a novel means to measure the weight of an object, such as an envelope whereby when the device is suspended, the weight of the wings is used to counterbalance both the body and the weight of an object, such as a counterbalance or envelope while providing a measurement of the object's weight. This counterbalance or envelope is suspended from the lower portion of the body at an aperture formed in the body using a rigid filament, such as stainless steel wire. A clip, such as an alligator clip, is suspended from the lower end of the filament onto which the counterbalance or envelope is clipped. The in-board leading edge of the right wing of the winged creature is formed with a fold-down scale tab on which indicia is provided to record weight. During pre-assembly, this scale tab is folded down at approximately 90° to the plane of the wing. After the wing is hingedly connected to the body, and while the wing is folded down against the body, the scale tab is inserted into an indicator slot formed in the front portion of the winged creature. As the counterbalance or envelope and, consequentially, the body is oscillated upwardly or downwardly, such that the wings are sequentially inclined downwardly toward the body and upwardly toward the body, the indicator slot remains vertical while the scale tab oscillates through it. Thus, the counterbalance or envelope pivots both wings while disposing the scale tab and its weight measuring indicia into registration with the indicator slot on the body to determine the weight of the counterbalance or envelope and its contents.

In order that the desired illusion of flight of the winged creature be provided when the device is not being used as a weight measuring device, the weight calibrations on the scale tab may be set so that a two-ounce mark, for example, is set in alignment with the indicator slot on the body when the wings are positioned in a slightly upward inclination from true horizonal, essentially a dihedral angle, when the creature is in a still air environment. The counterbalance, for this provision, is a two-ounce weight suspended from the lower portion of the body. In an indoor environment when air currents are often unavailable, this two-ounce counterbalance may be gently pulled downward and released by the user to activate a realistic simulation of flight, thereby exceeding a functional limitation of prior art. In an outdoor environment, such as a patio or deck where there is a light breeze, the dihedral angle of the wings encourages the moving air to activate the upward and downward oscillation of the wings and the desired simulation of flight.

In accordance with the invention, a decorative winged creature is provided that, regardless of the variation of configuration of the wing portions and body portions, displays an accurate simulation of flight and comprises an inherent balancing element for use as a scale for weighing objects.

In accordance with the another aspect of the present invention, the device is subject to mass production techniques and being susceptible of shipment in a fold-down, pre-assembled and pre-balanced condition ready for use by the purchaser of the item. Another aspect of the invention is the provision of a fixed attachment arrangement formed as tabs in the wings to allow use of ridged suspensory filaments capable of withstanding heavy use and high outdoor air currents without breakage.

Still another aspect of the invention is to provide a counterbalance suspended from the lower portion of the body that may be gently pulled downward and released by the user to activate a realistic simulation of flight in an indoor environment where air currents are often unavailable and, for an outdoor environment, the provision of a dihedral angle of the wings to encourage moving air to activate the upward and downward oscillation of the wings and the desired simulation of flight.

In accordance with yet a further aspect of the present invention, a mobile scale is provided that includes a body, a pair of opposing wing members pivotally mounted to the body, a device for suspending the body and the pair of opposing wing members, the suspending device being attached to the pair of opposing wing members, preferably at a balance point, such that the wing members will extend from the body in a predetermined orientation when suspended from the suspending device. Ideally, the predetermined orientation is a dihedral with the wings oriented slightly above the horizontal. The mobile scale further comprises an object suspending member depending from the body for suspending objects from the body and a scale associated with the body and the pair of opposing wing members to measure and visually display relative movement between at least one wing of the pair of wing members and the body.

In accordance with yet a further aspect of the present invention, the scale comprises a scaled tab extending from either of the body and at least one wing of the pair of wing members and an indicator on the other of the body or at least one wing of the pair of wing members that cooperates with the scaled tab. More particularly, the scaled tab extends from the bottom surface of one of the wing members, and the indicator comprises an opening in the body that is sized and shaped to permit the tab to project therethrough, preferably in a frictionless slidable arrangement.

In accordance with yet another aspect of the present invention, the scale tab includes indicia formed thereon in calibrated graduations, preferably the graduations are calibrated to ounces and at least one or more divisions of ounces, with the indicia labeling one or more the graduations in ounces. Movement of the tab through the opening in the body registers the tab with the body such that alignment of the body with a graduation will visually display the weight of an object suspended from the body.

In accordance with yet another aspect of the present invention, the body is formed to have a substantially flat, planar configuration with opposing, flat sides such that when the body is suspended, the flat sides have a vertical orientation. Ideally, the body will be longitudinally balanced to have a substantially horizontal orientation.

In accordance with a preferred embodiment of the invention, the body has a planform profile in the shape of a winged creature. Also, computer-generated images of anatomical details of a winged creature can be formed on the body and wings.

In accordance with yet a further aspect of the present invention, a counterbalance is removably suspended from the body to facilitate oscillatory movement of the body and the pair of wings in a manner to simulate a winged creature in flight.

To attain these features and such further advantages as may appear herein or be hereinafter pointed out, reference is made to the accompanying drawings and the following description.

BRIEF DESCRIPTION OF THE DRAWINGS

The foregoing and other feature advantages of the present invention will be more readily appreciated as the same becomes better understood from the following detailed description when taken in conjunction with the accompanying drawings, wherein.

DETAILED DESCRIPTION OF THE DRAWINGS

Figure 1:
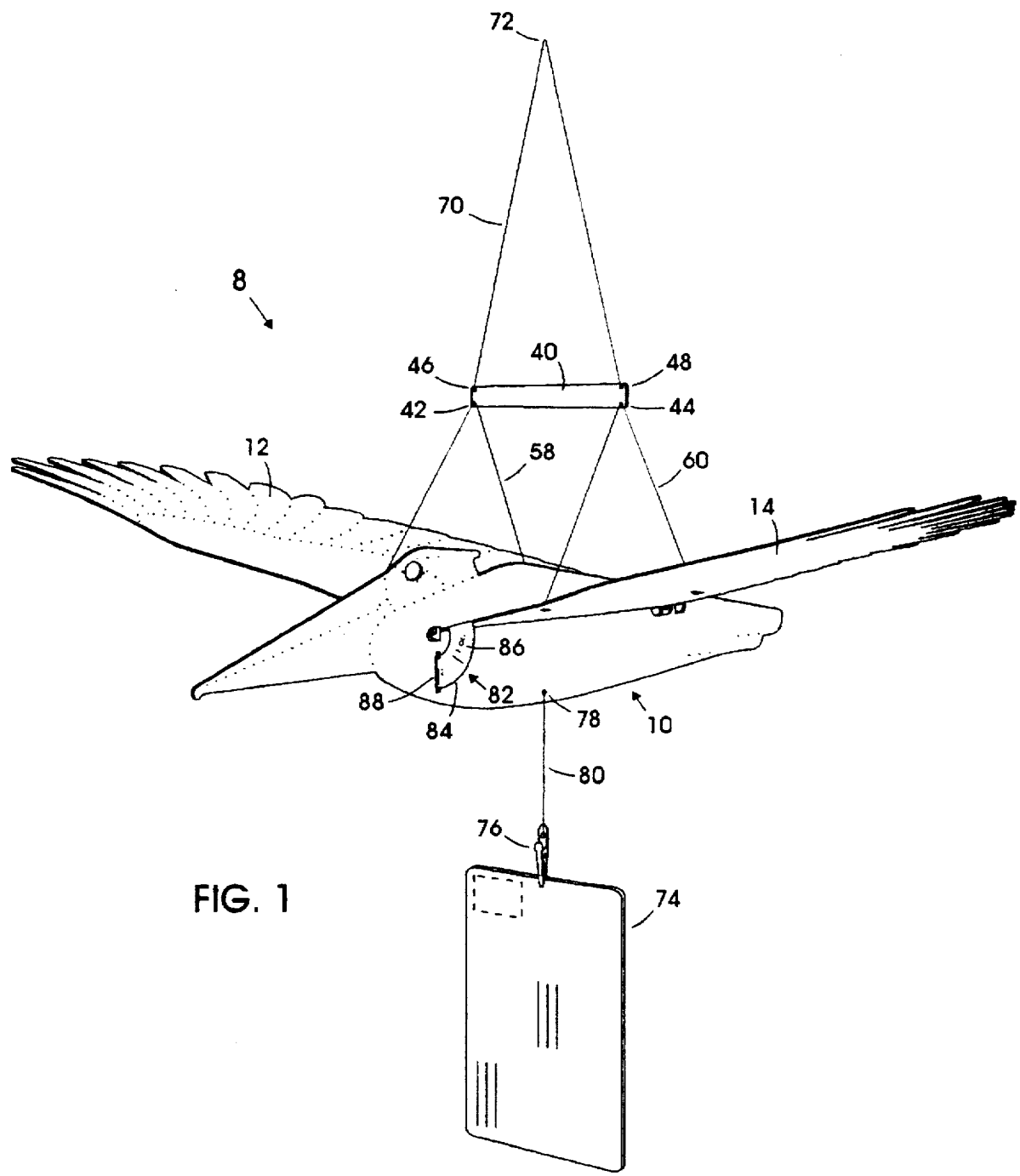
FIG. 1 is a perspective view of representative embodiment of a combination mobile device and envelope scale formed in accordance with the present invention.

Referring to the drawings, there is shown in FIG. 1 a movable sculpture 8 in the configuration of a bird in combination with an envelope scale formed in accordance with present invention, the apparatus including a body portion 10 fabricated in the form of a desired side elevation of a particular bird species, flying creature, etc. The device includes a pair of wing members 12, 14, which are articulately connectable to the body 10 in the manner set forth herein below. Ideally, the body portion 10 and wing portions 12, 14 are constructed of corrosion-resistant rigid material such as stainless steel sheet. However, other materials such as plastic or wood may be used without departing from the spirit and scope of the invention.

Figure 2:
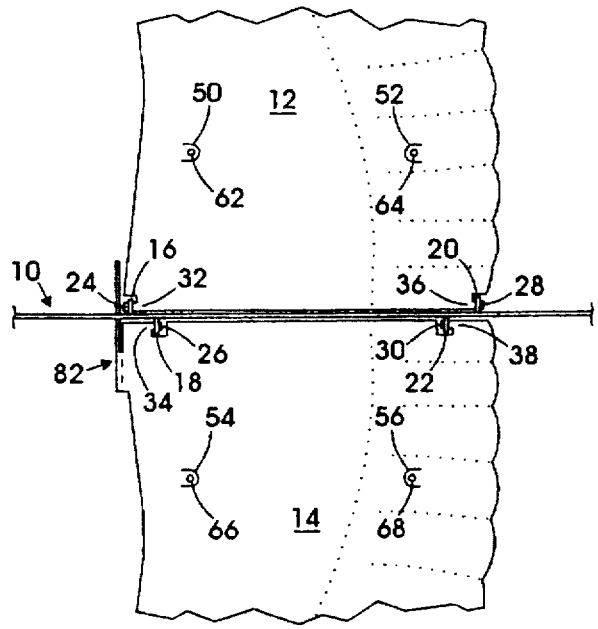
FIG. 2 is a partial plan view of the device of FIG. 1, with the wings in an outstretched position.
Figure 3:
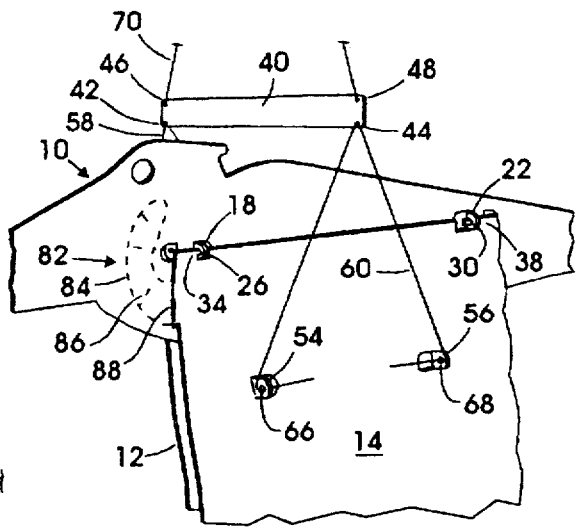
FIG. 3 is a partial perspective view of the body portion and folded-down wing portions of the device of FIG. 1.
Figure 4:
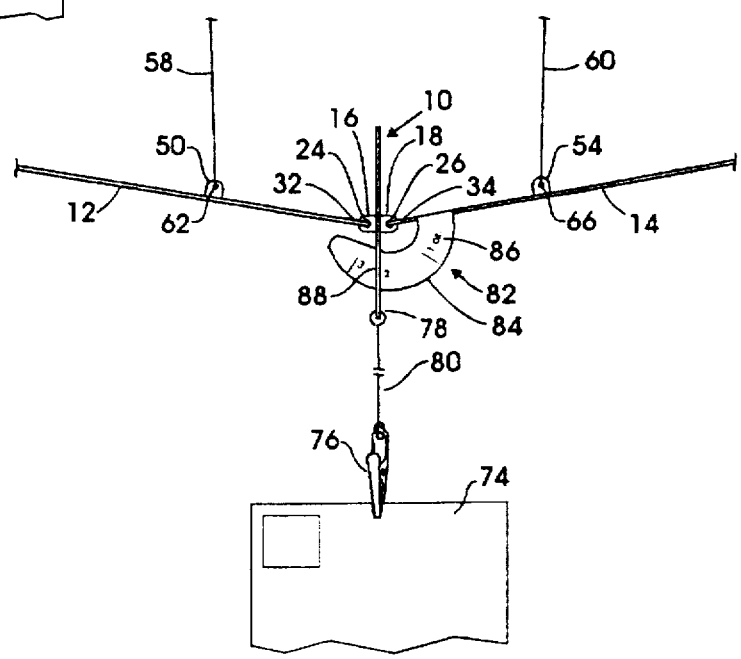
FIG. 4 is a partial frontal view of the device of FIG. 1 functioning as an envelope scale with the wings at a dihedral angle.

The connection between the wings and the body is effected between four spaced carrier members 16, 18, 20, 22, which are formed into the sheet metal material and folded out at 90° to the plane of the body to extend to opposite sides of the body, as best seen in FIGS. 2, 3 and 4.

The carrier members 16, 18, 20, 22 include bearing elements or aperture 24, 26, 28, 30 respectively as best seen in FIGS. 2, 3, and 4.

The wing members 12, 14 include at their forward ends pointed bearing receiver portions 32, 34. The rear edges of the wings included pointed bearing receiver portions 36, 38.

It can be seen in FIG. 2 that the distance between the receiver members 32 and 36 is such that the same are securely entrapped as they extend into apertures 24 and 28 respectively when carrier members 16 and 20 are folded out during assembly and thus, pivotally support the wing 12. Similarly, the distance between the receiver members 34 and 38 is such that the same are securely entrapped as they extend into apertures 26 and 30 respectively when carrier members 18 and 22 are folded out during assembly and thus, pivotally support the wing 14.

The apparatus includes a hanger member 40 formed of rigid material such as stainless steel sheet, the hanger including suspension apertures 42, 44 in the lower portion and suspension apertures 46, 48 in the upper portion. The wings 12 and 14 include spaced carrier members 50, 52, 54, 56 respectively as best seen in FIG. 2 in the folded down pre-assembled position and in FIGS. 3 and 4 in the folded up position.

A pair of suspension filaments 58 and 60 formed of rigid stainless steel wire or the like is passed through each of the suspension apertures 42 and 44 of hanger member 40 and whose ends extend through the carrier members 50, 52, 54, 56 at fixed suspensory apertures 62, 64, 66, 68 respectively, as clearly shown in FIG. 3. As shown in FIGS. 1, 2 and 4, the position of the carrier members 50, 52, and 56 on the wings 12, 14 through which the filaments 58 and 60 pass is critical to the balance condition of the device.

More particularly, if the carrier members 50, 52, 54 and 56 are located in positions remote from the body 10, the weight of the wing portion outward of this location will be unduly small and the bird will hang in such a manner that the wings will incline downwardly from the tip to the body. Conversely, if this location is unduly close to the body, the wings will incline downwardly from the body to the tip.

In order to assure that the position of carrier members 50, 52, 54 and 56 may be accurately and fixedly achieved, the hingedly connected wing and body components are pre-balanced by computer design and the desired balance is provided wherein, the wings 12, 14, in static air conditions, assume the desired dihedral angle as shown in FIGS. 1 and 4. When the device is suspended in a moving air current, the same will appear to fly since the air current will deflect the components in such a manner that the body is first above and then below the level of the wings.

A further suspension filament 70, formed of rigid stainless steel wire or the like, is passed at each end through suspension apertures 46 and 48 of hanger member 40 and whose center portion forms a bend 72, which may depend from any desired structural member, such as a hook affixed to a ceiling or overhead frame, etc.

A highly desirable feature of the invention resides in the provision of a scale to measure the weight of an object, such as an envelope as best seen in FIGS. 1 and 4. The weight of the wings 12 and 14 is used to counterbalance both the body 10 and weight of an object, such as a counterbalance or envelope 74. Envelope 74 is suspended from a clip 76 which is suspended from the lower portion of the body 10 at aperture 78 by yet another suspension filament 80, formed of rigid stainless steel wire or the like.

The inboard leading edge of wing 14 is formed with a fold-down scaled appendage 82. The arcuate edge portion 84 of the appendage 82 is defined by scale calibrations 86 including indicia designating fractions of weight in ounces, in the present instance the scale indicating 1, 2 and 3 ounces. The calibrations may be changed according to the weight of the counterweight intended for use in the scale. During assembly of the device, the appendage 82 is folded down at approximately 90° to the plane of the wing 14. With the wing 14 hingedly connected to the body 10 at the carrier members 18 and 22, the appendage 82 is inserted into a vertical slot 88 formed in the body portion 10 at the leading edge of the wing 14. The counterbalance or envelope 74 and, consequently, the body 10 is vertically oscillated upward and downward with the weight of the envelope 74, thus pivoting the wings 12 and 14. This action disposes appendage 82 and its weight measuring calibrations 86 into registration with the slot 88 on the body 10. By observing the point of registration of the slot 88 with respect to the calibrations 86 and the indicia designating the weight, the user can ascertain the weight of the envelope 74 and its contents and thus determine the amount of postage required.

In order that the desired illusion of flight of the winged creature of the device 8 can be provided when the device 8 is not being used for weight measuring, the weight calibrations 86 on the appendage 82 may be set so that the two-ounce indicia, for example, is set in alignment with the slot 88 on the body 10 when the wings 12 and 14 in static air conditions are balanced to assume the desired dihedral angle as shown in FIGS. 1 and 4. For this provision, the envelope 74 may be replaced by a two-ounce counterbalance (not shown) which may be pulled downward and released by the user to activate a realistic simulation of flight in an indoor environment where air currents are often unavailable. The same two-ounce counterbalance can be used on the device 8 in an outdoor environment where a moving air current activates the oscillation of the wings 12 and 14 and the desired simulation of flight.

From the foregoing description, it will be readily apparent that there is shown and described in accordance with the invention a novel, movable sculpture or mobile comprising an inherent balancing element for use as a scale for weighing objects that displays an accurate simulation of flight and one that is cost effective to manufacture on a mass production basis.

The advantages of forming the wing portions 12, 14 and body portions 10 from a computer-generated image will be readily apparent as well. These components can be pre-balanced by design and packaged and shipped in a flattened pre-assembled state thereby eliminating the need for the user to assemble and balance the device, regardless of the variation of the configuration of the wing portions 12 and 14 and body portion 10. This pre-balanced design also provides a fixed attachment of the wings 12 and 14 at carrier members 50, 52, 54 and 56 which allows the use of ridged and durable suspensory filaments thereby increasing the durability of the device in conditions of heavy use.

It must be understood that the form of the present invention as described is to be taken as a representative embodiment of the same and that changes may be made in the shape, size, material and configuration without departing from the spirit and the scope of the invention.

The embodiments of the invention in which an exclusive property or privilege is claimed are defined as follows:

1. A mobile scale comprising:
    (a) body;
    (b) a pair of opposing wing members pivotally mounted to said body;
    (c) means for suspending said body and said pair of opposing wing members, said suspending means attached to said pair of opposing wing members;
    (d) means for suspending an object from said body; and
    (e) a scale associated with said body and said pair of opposing wing members to visually display accurate scaled measurement of relative movement between at least one wing of said pair of wing members and said body, wherein said body, said opposing wing members, said suspending means for said body and said wing members, said object suspending means, and said scale are pre-balanced such that said wing members will extend from said body in a predetermined orientation when suspended from said suspending means without requiring adjustment to the pre-balanced condition of the mobile scale.

2. The mobile scale of claim 1, wherein said scale means comprises a tab extending from either of said body or at least one wing of said pair of wing members and indicating means formed on the other of said body and said one wing of said pair of wing members, said indicating means cooperating with said tab to visually display the relative movement of said body and said at least one wing of said pair of wing members.

3. The mobile scale of claim 2, wherein said tab extends from said at least one wing of said pair of wing members, and said indicating means comprises an opening in said body sized and shaped to permit said tab to project therethrough.

4. The mobile scale of claim 3, wherein said tab includes indicia formed thereon in calibrated graduations for a predetermined scale of weight measurement whereby as said tab is registered within said opening in said body, alignment of said body with said indicia will visually display a weight measurement.

5. The mobile scale of claim 4, wherein said graduations are calibrated to ounces, and said indicia labels one or more of said graduations in ounces.

6. The mobile scale of claim 1, wherein said body is formed to have a substantially planar configuration with flat, opposing sides, whereby as said body is suspended from said suspending means, said flat sides are in a substantially vertical orientation.

7. The mobile scale of claim 6, wherein said body has a planform profile in the shape of a winged creature.

8. The mobile scale of claim 7, wherein said body and said pair of wing members have computer-generated images of anatomical details of a winged creature formed thereon.

9. The mobile scale of claim 1, further comprising a counterbalance removably suspended from said body for facilitating oscillatory movement of said body and said pair of wing members in a manner to simulate a winged creature in flight.

10. A combination mobile and scale configured for suspension from a structural member and further configured for weighing lightweight objects, said combination mobile and scale comprising:
    (a) an elongate body having a substantially planar configuration with opposing flat sides;
    (b) a pair of wings pivotally mounted to said body, one wing pivotally mounted on each of said flat sides of said body, each of said wings having a top surface and a bottom surface;
    (c) a suspension harness for suspending said body and said pair of wings in balanced relationship such that said wings extend from said body in a substantially dihedral orientation, said suspension harness being attached to fixed, predetermined balanced points on said top surface of each of said wings to hold said elongate body in a horizontally-oriented position with said flat sides in a substantially vertical orientation and to facilitate oscillatory movement between said body and said pair of wings;
    (d) means for suspending a lightweight object from said body; and
    (e) a scale cooperating with said pair of wings and said body to visually display an accurate measurement of the relative movement of at least one wing of said pair of wings and said body, wherein said elongate body, said pair of wings, said lightweight object suspending means, and said scale are pre-balanced such that when assembled no adjustment in the balanced relationship between said pair of wings and said body is required.

11. The combination mobile and scale of claim 10, wherein said scale means comprises a tab extending from either of at least one wing of said pair of wings or said body.

12. The combination mobile and scale of claim 11, wherein said tab is pivotally mounted to extend from said bottom surface of at least one wing of said pair of wings.

13. The combination mobile and scale of claim 12, wherein said scale means further comprises an indicator that cooperates with said tab for visual indication of the weight of an object attached to said suspending means, said indicator comprising an opening formed in said body through which said tab projects.

14. The combination mobile and scale of claim 13, wherein said tab includes indicia formed thereon in calibrated graduations for a predetermined scale of weight measurement.

15. The combination mobile and scale of claim 14, wherein said graduations are calibrated to ounces, and said indicia label one or more of said graduations in ounces.

16. The combination mobile and scale of claim 10, wherein said body has a planform profile in the shape of a winged creature.

17. The combination mobile and scale of claim 16, wherein said body and said pair of wings have computer-generated images of anatomical details of a winged creature formed thereon.

18. The combination mobile and scale of claim 10, further comprising a counterbalance removably suspended from said body to facilitate oscillatory movement of said body and said pair of wings in a manner to simulate a winged creature in flight.

* * * * *